(12) United States Patent
Natanzon

(10) Patent No.: US 12,130,779 B2
(45) Date of Patent: Oct. 29, 2024

(54) METHOD AND KEY VALUE-BASED DEVICE FOR DATA DEDUPLICATION AND RANDOM ACCESS

(71) Applicant: Huawei Technologies Co., Ltd., Shenzhen (CN)

(72) Inventor: Assaf Natanzon, Hod Hasharon (IL)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/315,839

(22) Filed: May 11, 2023

(65) Prior Publication Data
US 2023/0281166 A1 Sep. 7, 2023

Related U.S. Application Data

(63) Continuation of application No. PCT/EP2020/081795, filed on Nov. 11, 2020.

(51) Int. Cl.
*G06F 16/00* (2019.01)
*G06F 16/174* (2019.01)

(52) U.S. Cl.
CPC ................. *G06F 16/1752* (2019.01)

(58) Field of Classification Search
CPC ..................................... G06F 16/1752
See application file for complete search history.

(56) References Cited

U.S. PATENT DOCUMENTS

2015/0293817 A1 10/2015 Subramanian et al.
2017/0286443 A1* 10/2017 Ram .................. G06F 11/1464

* cited by examiner

*Primary Examiner* — Ajith Jacob
(74) *Attorney, Agent, or Firm* — Conley Rose, P.C.

(57) ABSTRACT

A method of storing a data file in a key value-based storage system includes dividing the data file into at least two variable size chunks. Each of the variable size chunks is divided into blocks, where the blocks have different sizes depending on the amount of data in each block. A set of metadata is generated for the data file including information indicating the size of each block and the size of each chunk and writing the data file and the set of metadata to the key value-based storage.

20 Claims, 6 Drawing Sheets

METHOD AND KEY VALUE-BASED DEVICE FOR DATA DEDUPLICATION AND RANDOM ACCESS

CROSS-REFERENCE TO RELATED APPLICATIONS

This is a continuation of International Patent Application No. PCT/EP2020/081795 filed on Nov. 11, 2020. The disclosure of the aforementioned application is hereby incorporated by reference in its entirety.

TECHNICAL FIELD

The present disclosure relates generally to the field of data protection and deduplication; and more specifically, to a method, a key value-based storage device, and system for storing a data file with generated metadata (e.g. in a smart file format) in a key value-based storage system for achieving variable size deduplication and random access of data in the data file.

BACKGROUND

Generally, data backup is used to protect and recover data in an event of data loss in a primary storage system (e.g. a host server). For safety reasons, a separate backup system or a storage system is extensively used to store a backup of the data present in the primary storage system. Typically, with time, storage space of the storage system becomes occupied as changes in data or any new data occupy a large storage space in storage systems. This is undesirable as it causes reduction in performance of the storage systems. Moreover, the cost of data storage, with all the associated costs including cost of storage hardware, continues to be a burden. Typically, data deduplication is a process widely used by the storage system to eliminate duplicate or redundant data stored on the storage system without compromising the fidelity of the original data. In storage systems, generally data is stored in block storage devices, where a given block storage device is a computer data storage device that supports reading and optionally, writing data in fixed-size blocks, sectors, or clusters.

Currently, block storage systems (or devices) usually employ fixed size deduplication to save storage space. The fixed size deduplication divides the data stored in the storage system to fixed-size blocks, such as 8 kilobytes (KB) aligned blocks. For each fixed-size block, a signature is created. If the aligned block that is to be written has the same signature as an already stored block in the storage system, the aligned block is considered identical. Hence, the aligned bock is not stored again in the storage system. Instead a pointer is kept for the block identical to the aligned bock in the storage system. However, the fixed size deduplication manifest low deduplication ratio which is undesirable. Further, fixed size deduplication can perform deduplication only if the blocks are identical. Hence, fixed size deduplication fails to deduplicate the blocks if data within each block is similar but not identical. For example, if a first block and a second block are identical but the second block is shifted by certain bytes, say 512 bytes, or an insert switch is added to the second block, fixed size deduplication fails to identify the second block as identical to the first block, and thus, does not provide reliable deduplication of the blocks. There is another technique for employed for data reduction known as differential compression. The differential compression allows better data deduplication than the fixed size deduplication. However, the differential compression requires significant amount of computational processing power (e.g. extensive use of central processing unit) for data deduplication process and thus, increases time and unnecessary use of computational resources to complete an operation.

There is another technical problem of how to randomly access chunks of data. Random access refers to the ability to access data at random and performs better than sequential access if information is to be accessed randomly. Generally, a key value-based store associates each data value with a unique key. In other words, a key value-based storage allows accessing specific data using a key. An application can store arbitrary data as a set of values, where a given value (data) can be retrieved or stored by a given key. In an example, when fixed size chunking is used random access is easy as a key to data may be simply a "file_ID" plus a specified offset. But when chunking a file to variable length pieces, an 8 KB fixed size chunk may then include less than 8 KB of data due to compressible data padding, and due to other issues as described above, for example, byte shifting and insert switches, the complexity is increased and the accuracy for random access is reduced.

Therefore, in light of the foregoing discussion, there exists a need to overcome the aforementioned drawbacks associated with methods, devices, and storage systems for data deduplication.

SUMMARY

The present disclosure seeks to provide a method, a key value-based storage device, and system for achieving variable size deduplication. The present disclosure seeks to provide a solution to the existing problem of lower data reduction ratios that is how to further reduce data in a storage and how to randomly access chunks of data in case of chunking a file to variable length chunks in a key value-based storage. An aim of the present disclosure is to provide a solution that at least partially overcomes problems and provides an improved method, device, and system that manifest improved data reduction ratios and system performance (i.e. low computational resources usage) in a key value-based storage device as compared to other systems. Moreover, the present disclosure also provides a technical solution that enables an effective and accurate random access to chunks of data even in case of chunking a data file to variable length chunks in the key value-based storage device.

The object of the present disclosure is achieved by the solutions provided in the enclosed independent claims. Advantageous implementations of the present disclosure are further defined in the dependent claims.

In an aspect, the present disclosure provides a method of storing a data file in a key value-based storage system. The method comprises the steps of dividing the data file into at least two variable size chunks, dividing each of the variable size chunks into blocks, wherein the blocks may have different sizes depending on the amount of data in each block, generating a set of metadata for the data file including information indicating the size of each block and the size of each chunk and writing the data file and the set of metadata to the key value-based storage.

The method of the present disclosure provides improved data deduplication ratios, for example, data in the data file. The method leverages fixed size deduplication mechanisms and achieves variable length deduplication, which ensures that performance of random writes is similar to that of the random writes performance as with fixed size deduplication system. The method enables storing the data in one large data file, where each chunk is designed to keep space for data movement of data upon every write operation. This prevents data spilling between different chunks of the data file and allows granularity in chunking (i.e. one chunk can be re-chunked when new data arrives for the data file without affecting any other part or chunks of the data file), and thus eliminates the need of re-write the entire data file for subsequent write operation (like in other systems) and improves random access. For example, the generated metadata allows to accurately perform random access to any data in the data file.

In an implementation form, for one of the variable size chunks having a size m, the step of dividing it into blocks comprises dividing each chunk into blocks including n fixed size blocks having a fixed size k and one residue block having the size p, n being the result of an integer division of m/k and p being the remainder of the integer division.

Each chunk of the data file is divided into blocks for effective data deduplication and random write operations to the data file. When the chunk of the data file is divided into blocks, the chunk is in fact divided into n fixed size blocks of fixed size k and one residue block having the size p. In other words, the method leverages fixed size deduplication mechanisms and achieves variable length deduplication, which ensures that performance of random writes is similar to that of the random writes performance as with fixed size deduplication system.

In an implementation form, the residue block is the last block in the variable size chunk.

In contradiction to other systems, the residue block, which is the last block, may have a different size (e.g. less than 8 KB) than remaining blocks, and the residue block is not required to be padded with known compressible data, which further reduces storage area and improves system performance (e.g. input/output (I/O) read/write efficiency and bandwidth).

In an implementation form, the method further comprises the step of performing duplication on the at least two blocks based on the metadata information regarding the size of each block.

The method improves data reduction ratios as well as improves accuracy of random access using the metadata information.

In an implementation form, the method further comprises the steps of receiving a new sequence of data to be written to the data file, determining the offset and size of the new sequence of data and writing it to the data file based on the offset without changing the division into chunks and blocks.

Typically, in a backup scenario, it is desired to update data chunking upon every backup. However, in other systems, the problem with re-chunking the data is that due to new holes (i.e. new location where variable size chunks end, or new blocks inserted which have size of less than a given block size, such as 8 KB) a file format may not handle such new write data, and storage of new write data may result in byte shifting, and thus may need to rewrite the whole file. In contradiction to other systems, the method enables writing of the new sequence of data to the data file, where the chunk is designed to keep space for data movement of data upon every write operation. This prevents data spilling between different chunks of the data file, and because of the determined offset and size of the new sequence of data, when new sequence of data arrives for the data file, the additional space kept in advance in a given chunk for data movement can accommodate the new write data without affecting any other part or chunks of the data file, and thus eliminates the need of re-write the entire data file for subsequent write operation (like in other systems) and improves random access.

In an implementation form, k is 8 KB or a multiple of 8 KB.

The combination of the block-based storage that is used as the key value-based storage further improves the deduplication and random access in backup scenarios.

In an implementation form, the set of metadata also includes a first offset value indicating the start of the first block of the data file.

The first offset value that indicates the start of the first block (e.g. a metadata block) enables to understand where the actual data (e.g. all the 8 KB of block data) is located in a chunk in the data file, which allows accurate random access even in variable sized chunks.

In an implementation form, the method comprises the steps of dividing the data file into at least two fixed size chunks having a fixed size x, independently of the division into variable size chunks and within each fixed size chunk, and when writing the data file to the key value storage, including padding for each fixed size chunk, said padding being positioned within the fixed size chunk and/or after the fixed size chunk.

The padding (i.e. compressible data padding or non-zero padding) is done within the fixed size chunk and/or after the fixed size chunk so that the at least two fixed size chunks have adequate space for data movements when new write data is received, and that there is no chance of data spilling between at least two fixed size chunks.

In an implementation form, the padding for each fixed size chunk is added to a total chunk size of $(1+n/y)*x$, where n is the size of the fixed size blocks, y is the average size of the variable size chunks and x is the size of the fixed size chunks.

The padding within the fixed size chunk and/or after the fixed size chunk is such added that the total chunk is of size of $(1+n/y)*x$ after adding padding to ensure no data spilling between the at least two fixed size chunks of the data file.

In an implementation form, each fixed size chunk comprises metadata indicating an offset of data in the fixed size chunk to allow random access to the data in the file.

In order to allow random accessing of data in the data file, the metadata that indicates the offset of data is stored in the metadata block at the beginning of each of the at least two fixed size chunks.

In an implementation form, the method further comprises the step of writing the data file to the key value storage includes, for each variable size chunk in the file having a size y: compressing the variable size chunk to a size smaller than y, writing the compressed variable chunk to the storage and padding the variable chunk up to the size y rounded to the block size.

In a scenario, if the variable size chunk is compressed to the size smaller than y, the variable size chunk is padded with compressible data or address space of the chunk is adjusted to make the size of the variable size chunk after the compression same as that before compression in order to be continue to write to the compressible variable size chunk. The method allows chunk level compression with random access manipulation.

In an implementation form, a block storage is used as the key value storage, using the block address as the key, comprising the step of padding the block storage with compressible data up to the block size.

The data file is stored in form of blocks in the block storage. The block storage uses the block address as the key to randomly access the blocks of the data file stored in the block storage. Further, the block storage pads the compressed variable chunk data with known compressible data so that the size of variable chunk data after compression was the same as before compression to enable to continue writing to the compressed variable size chunk.

In another aspect, the present disclosure provides a key value-based storage device. A control unit for a key value-based storage device for storing a data file, said control unit being arranged to perform the following steps for a data file being stored in the storage device: divide the data file into at least two variable size chunks, divide each of the variable size chunks into blocks, wherein the blocks may have different sizes depending on the amount of data in each block, generate a set of metadata for the data file including information indicating the size of each block and the size of each chunk and writing the data file and the set of metadata to the key value-based storage.

The key value-based storage device of this aspect achieves all the advantages and effects of the method of the present disclosure.

In an implementation form, the control unit is arranged to divide one of the variable size chunks having a size m, by dividing each chunk into n blocks having a fixed size k and one residue block having the size p, n being the result of an integer division of m/k and p being the remainder of the integer division.

Each chunk of the data file is divided into blocks for effective data deduplication and random write operations to the data file. When the chunk of the data file is divided into blocks, the chunk is in fact divided into n fixed size blocks of fixed size k and one residue block having the size p. In other words, the method leverages fixed size deduplication mechanisms and achieves variable length deduplication, which ensures that performance of random writes is similar to that of the random writes performance as with fixed size deduplication system.

In an implementation form, control unit is arranged to place the residue block as the last block in the variable size chunk.

In an implementation form, the control unit is further arranged to perform deduplication on the at least two blocks based on the metadata information regarding the size of each block.

The control unit performs efficient data reduction by leveraging fixed size deduplication mechanisms and achieve variable length deduplication. The control unit performs deduplication based on the metadata information of the at least two blocks.

In an implementation form, the control unit is further arranged to receive a new sequence of data to be written to the data file, determine the offset and size of the new sequence of data and write it to the data file based on the offset without changing the division into chunks and blocks.

The control unit performs random writes similar to random writes performance as with fixed size deduplication system and thus, allows faster random writes.

In an aspect, a computer program product comprising computer-readable code which when run in a control unit controlling a key value-based storage device will control the writing of the data file to the key value-based storage device by performing the method.

The computer program product of this aspect achieves all the advantages and effects of the method of the present disclosure.

In an implementation form, a computer program product comprising a non-transitory storage on which the code is stored. The non-transitory storage stores computer-readable instructions being executable by a processor to execute the method.

It has to be noted that all devices, elements, circuitry, units and means described in the present disclosure could be implemented in the software or hardware elements or any kind of combination thereof. All steps which are performed by the various entities described in the present disclosure as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof. It will be appreciated that features of the present disclosure are susceptible to being combined in various combinations without departing from the scope of the present disclosure as defined by the appended claims.

Additional aspects, advantages, features and objects of the present disclosure would be made apparent from the drawings and the detailed description of the illustrative implementations construed in conjunction with the appended claims that follow.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

Figure 1:
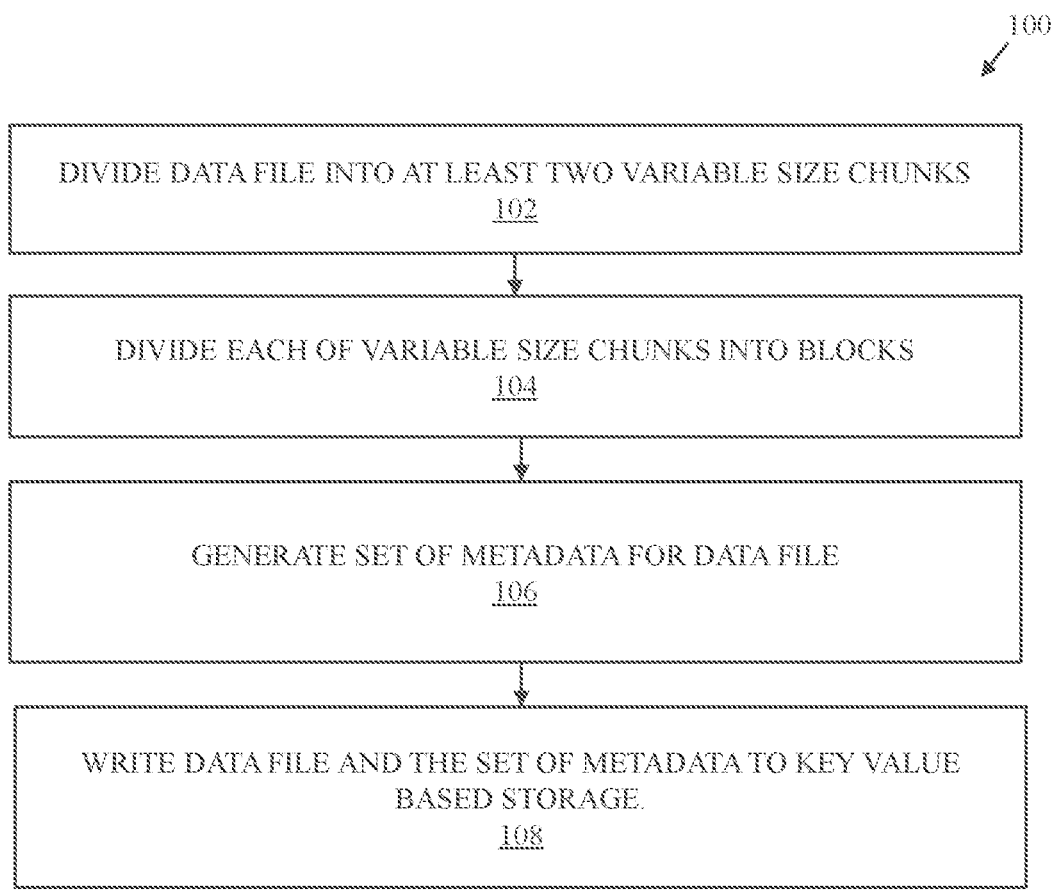
FIG. 1 is a flowchart of a method for storing a data file in a key value-based storage for achieving variable size deduplication and random access, in accordance with an embodiment of the present disclosure.

FIG. 1 is a flowchart of a method 100 for storage of a data file with metadata in a key value-based storage for achieving variable size deduplication, in accordance with an embodiment of the present disclosure. The method 100 is executed by a key value-based storage device described, for example, in FIG. 2. The method 100 includes steps 102, 104, 106 and 108.

The method 100 is used for storage of the data file in the key value-based storage system. Alternatively stated, a block storage is used as the key value-based storage, where a key is a block address and if value (data value) is less than a block size, than the block can be padded with compressible data (e.g. padded with ones, or any other compressible characters). The data file refers to any electronic file that stores data to be used by a computer application or a database system, including I/O data. The key value-based storage refers to a storage that stores the data file using key-value entries. The key value-based storage supports accessing (reading and writing) data file by creating mapping between a key and corresponding value (i.e. data) in the data file and hence, provides a way to quickly and reliably store, retrieve, and update the data file in the key value-based storage. An implementation of the key value-based storage, such as a key value-based storage device, is described in detail, for example, in FIG. 2.

At step 102, the method 100 comprises dividing the data file into at least two variable size chunks. The data file is divided into at least two variable size chunks such as a first chunk and a second chunk by a control unit (e.g. a processor) of the key value-based storage device. It is to be understood that the data file may be divided into multiple chunks, that is more than two chunks without limiting the scope of the disclosure. For the sake of brevity, at least two variable size chunks are used for explaining the method 100. The average chunk size of the first chunk and the second chunk is larger than a given size of a fixed size block. For example, the size of fixed size block may be 8 KB, whereas the chunk size of the first chunk and the second chunk may be much larger than 8 KB, such as 20 KB and 13 KB respectively. The data file may be divided into at least two variable size chunks using known variable chunking method, such as content-defined chunking. The variable size chunks are stored in the key value-based storage device aligned to the fixed size block. An example of dividing the data file to variable sized chunks is shown and described in detail, for example, in FIG. 3.

At step 104, the method 100 further comprises dividing each of the variable size chunks into blocks, wherein the blocks may have different sizes depending on the amount of data in each block. Each variable size chunks, such as the first chunk and the second chunk are divided into blocks by the control unit of the key value-based storage device. Generally, one block occupies a specific number of bytes of physical storage space in the block storage used as the key value-based storage, such as 4 KB block, 8 KB block, and the like. The block may be also referred to as a logical block. In this case, the size of each block depends on the amount of data in each block. For example, the first chunk of 20 KB may be divided into three blocks where two blocks are of size 8 KB and one block is of 4 KB. An example of dividing each of the variable size chunks into blocks is shown and described, for example, in FIG. 3.

In accordance with an embodiment, for one of the variable size chunks having a size m, the step of dividing it into blocks comprises dividing each chunk into blocks including n fixed size blocks having a fixed size k and one residue block having the size p, n being the result of an integer division of m/k and p being the remainder of the integer division. In a scenario, if size of the chunk, such as the first chunk is m and the first chunk is divided into blocks, then the first chunk is divided into n fixed size blocks of size k and one residue block of size p. The size p of the residual block is lesser than the size k of n fixed size blocks. For example, if the size of the first chunk is 20 KB (say, m=20 KB) and is divided into fixed size blocks of size 8 KB (say k=8), the first chunk is divided into 2 (i.e. n=2) fixed size blocks by the integer division of 20/8 and one residual block of size 4 KB (i.e. p=4) determined by remainder of the integer division.

In accordance with an embodiment, the residue block is the last block in the variable size chunk. For example, if the first chunk of 20 KB is divided into a first block of 8 KB, a second block of 8 KB and a third block of 4 KB, the third block is the residue block.

Optionally, the residue block is stored in the key value-based storage with size less than the fixed size k. The k is 8 KB or a multiple of 8 KB. For example, the fixed size k of n fixed size blocks may be 8 KB, 16 KB, 24 KB, and the like. In an implementation, the backend storage (e.g. a block storage that is used as the key value-based storage) allows storing blocks (i.e. small chunks) in the key value store, which are less than or equal to 8 KB, and thus there is no need to leverage ones (or any other fixed character compressible padding) padding. In other words, the chunks are divided to block of size 8 KB except the last block which is less than 8 KB, which can be stored as an object with less than 8 KB, saving the need to transfer (or transmit) ones (or any other fixed character padding) in I/O operations, such as random writes, thereby saving bandwidth.

In some systems, because of the properties of some block storage systems, typically all blocks must have the same size, and therefore the last block of each chunk, if less than 8 KB is padded with trailing compressible trailer (e.g. ones or any other fixed character compressible padding) up to the standard size (typically 8 KB). In contradiction to such systems, the method 100 is flexible and allows dividing each of the variable size chunks into blocks, wherein the blocks may have different sizes depending on the amount of data in each block, and there is no strict requirement to pad the last block of each chunk, if less than 8 KB with trailing compressible data to make it of standard block size, which improves bandwidth and saves the need to transfer (or transmit) zeros (or any other fixed character padding) in I/O operations, such as random writes, and in storage/backup activities. However, it is to be understood that, alternatively, the residue block can be padded with compressible data without limiting the scope of the disclosure, although such padding may decrease bandwidth.

At step 106, the method 100 further comprises generating a set of metadata for the data file including information indicating the size of each block and the size of each chunk. The metadata for the data file is generated by the control unit of the key value-based storage device. The metadata includes information regarding the size of each block and the size of each chunk to allow random access of each block of the data file for random write/read operation. Based on the set of metadata for the data file, the data file is saved by using key-value entries. Hence, random access of each block and chunk are allowed by accessing the correct key-value entries. The metadata may further include information such as the data file name, the data file ID and other data file properties.

In accordance with an embodiment, the set of metadata also includes a first offset value indicating the start of the first block of the data file. The first offset value is a number of address locations from a base address in order to get to a specific absolute address of the first block of the data file. The first offset value that indicates the start of the first block (e.g. a metadata block) enables to understand where the actual data (e.g. all the 8 KB of block data) is located in a chunk in the data file, which allows accurate random access even in variable sized chunks.

At step 108, the method 100 further comprises writing the data file and the set of metadata to the key value-based storage. The writing of the data file to the key value-based storage is performed by the control unit of the key value-based storage device. The set of metadata represents a set of key value store entries, and random access is allowed by accessing the correct key. Thus, the set of metadata enables to understand where the actual data (e.g. all the 8 KB block data) is located, which allows accurate random access even in variable sized chunks.

In accordance with an embodiment, the method 100 further comprises performing deduplication on the at least two blocks based on the metadata information regarding the size of each block. The deduplication is performed by the control unit of the key value-based storage device to reduce duplicate data, if any in the data file (or other files in the key value-based storage device). In order to perform deduplication, blocks must have the same a) size and b) content. The deduplication is performed using the metadata information, such as size and key value entries of the at least two blocks. If content of a block is identical or even similar to prestored data of another block, the duplicate copy may not be stored by executing the deduplication. The deduplication may be executed as the data is being written into the key value-based storage or as a backend activity to eliminate duplicates after the data is written to key value-based storage. For example, a same chunk may be shared between two or more users, say logical unit 1 (LU1) and LU2. In such cases, the control unit (e.g. a processor) of the key value-based storage device may keep two key value entries to access the chunk, the same data entry is shared, and is thus deduplicated. The key points to the physical location of the data in the data file.

In other systems, in an example, if a data file of size 40 KB, is divided using fixed sized chunking, the file will have 5 fixed sized blocks of 8 KB (may also be referred to as 8 KB chunks). Moreover, if in the same data file of 40 KB, if new data of one KB (1 KB) is added in the beginning of the first fixed size chunk, this change then will result in a second file (of 41 KB) that will have six fixed sized blocks (or 6 small chunks). Further, all the six fixed sized blocks (6 small chunks) will be different, for example, due to byte shifting, which will result in low deduplication ratios in case of fixed size deduplication as identical blocks cannot be found to execute deduplication.

In contradiction to other systems, if the same data file of 40 KB is divided using variable sized chunking (as described at step 104), for example, three variable sized chunks may be formed, such as chunk 1 of size 13 KB, chunk 2 of size 7 KB, and chunk 3 of size 20 KB. Further, in accordance with the method 100, in this example, each chunk may be divided into 8 KB blocks and a residue block. For example, chunk 1 of 13 KB is divided into 2 pieces (one block of 8 KB of data, another block of 5 KB of data without padding any compressible data at the end of the first block. Similarly, chunk 2 of 7 KB is divided into 1 piece (one block of 7 KB of data without any padding of zero to make it 8 KB at the end). Lastly, chunk 3 of size 20 KB is divided into 3 pieces (one block of 8 KB data, another block of 8 KB data, and a residue block of 4 KB of data). Thus, after variable size chunking, in this case, the data file has 6 chunks of 8 KB (instead of 5 chunks as in fixed sized chunking). The data file then is stored as six key value pairs or entries (assuming the file id is 1): $(1,0 \rightarrow o1)$; $(1,8 \rightarrow o2)$; $(1,16 \rightarrow o3)$; $(1,24 \rightarrow o4)$; $(1,32 \rightarrow o5)$; and $(1,40 \rightarrow o6)$, where "1" represents file ID, "0,8,16,24,32,40" represents block size of 8 KB with corresponding offsets/gap of block size, and $o1, o2, \ldots, o6$ represents consecutive offsets. As each chunk has some space at end of residue block, even when new data is inserted, most of the chunks remains same allowing better deduplication like that of deduplication ratio achieved in a variable size deduplication. In the above example, in case of the variable sized chunking, now if 1 KB is added in the beginning, then only chunk 1 of 13 KB may become chunk 1' of 14 KB, which is different since it has now offset of 1 KB), but this new data write of 1 KB will not spill to chunks 2 and 3, which are still identical leading to deduplication of the 4 blocks employed by chunks 2 and 3 (i.e. a higher deduplication ratio is achieved as compared to other systems).

Furthermore, another issue is how to randomly access chunks of data in case of chunking a file to variable length pieces in the key value-based storage. In an example, when fixed size chunking is used random access is comparatively easy as the key to the data is the file ID plus the offset. But when chunking the data file to variable length chunks, an 8 KB fixed size chunk may include less than 8 KB of data (e.g. in the residue block where data less than 8 KB can be stored even without zero padding, in this case). Thus, in order to do mapping (i.e. the mapping between a key and corresponding data value in the data file), a format of the data file may be modified. Moreover, in order to allow fast random writes, when a random write arrives to the data file, the random write will not be chunked by the variable size algorithm, but it will be written in place using a current chunking, as discussed below. In other words, the variable size chucking may occur only when the data file is created for the first time by a backup system, which ensures the performance of random writes to be similar to random writes performance as with the fixed size deduplication.

In accordance with an embodiment, the method 100 further comprises the steps of receiving a new sequence of data to be written to the data file, determining the offset and size of the new sequence of data and writing it to the data file based on the offset without changing the division into chunks and blocks. The new sequence of data is received by the control unit of the key value-based storage device. The new sequence of data is the new data (i.e. a subsequent write) that arrives to be written in the data file. The new sequence of data is written to the data file without being chunked for example, by the variable size algorithm. Rather, the new sequence of data is written based on its predetermined offset in the already chunked data file (e.g. using the metadata block). This allows faster random writes. An example of how to effectively configure a data file to be able to write the new sequence of data in the data file, is shown and described, for example, in FIGS. 5A-5C.

In accordance with an embodiment, the method 100 further comprises the steps of dividing the data file into at least two fixed size chunks (e.g. larger fixed sized chunks) having a fixed size x, independently of the division into variable size chunks and within each fixed size chunk, and when writing the data file to the key value storage, including padding for each fixed size chunk, said padding being positioned within the fixed size chunk and/or after the fixed size chunk. In this case, the data file is divided into at least two fixed size chunks, for example, the first chunk and the second chunk of size x. Additionally, padding (e.g. padding of compressible data) is added to each the first chunk and the second chunk so that adequate space is kept in each chunk to allow space for movement of the data while performing new writes in the data file. Hence, padding prevents data spilling between different chunks (e.g. the first chunk and the second chunk) when performing new writes, avoids re-copying of entire data file, and thus, makes writing the data file faster. In an implementation, the padding may be added within each of the divided chunks. In another implementation, padding may be added in some chunks, while some chunks may not be padded with compressible data depending on how much new data writes is expected to be written in the data file. In an example, if a 16 megabyte (MB) chunk is divided into four 4 MB chunks, almost 50% of data may be padded with compressible data, that is 2 MB of padding for each 4 MB chunks, which is further described in detail, for example, in FIGS. 5A-5C.

In accordance with an embodiment, the padding for each fixed size chunk is added to a total chunk size of (1+n/y)*x, where n is the size of the fixed size blocks, y is the average size of the variable size chunks and x is the size of the fixed size chunks. The size of the fixed size chunk (i.e. x) may grow in size due to adding padding within the data file. The data file can maximum grow to size of (1+n/y)*x due to the padding. There, n represents the size of the fixed size blocks (e.g. n may be 8 KB), y represents average chunk size of fixed size blocks and x represents size of the fixed size chunks (assuming the average is forced to be kept in each such 4 MB fixed size chunk). For example, if the size of the fixed size chunks (denoted by x) is 4 MB, average chunk size of the fixed size blocks (chuck size denoted by y) is 16 KB and the size of the fixed size blocks (represented by n) is 8 KB, each chunk will be padded with at most 8 KB of zeros. So, for every 16 KB of data, we add 8 KB of data, i.e. the zeros are at most 50% of the data. Hence, the block of 4 MB will grow to a maximum of 6 MB. The padding is done within the fixed size chunk and/or after the fixed size chunk so that the at least two fixed size chunks have adequate space for data movements when new write data is received, and that there is no chance of data spilling between at least two fixed size chunks. An example of the data file that includes padding is shown and described, for example, in FIGS. 5A-5C.

In accordance with an embodiment, each fixed size chunk comprises metadata indicating an offset of data in the fixed size chunk to allow random access to the data in the file. In order to allow accessing of data in the data file in random access, each chunk comprises metadata, which is stored in the first block referred to as a metadata block at the beginning of each of fixed size chunks. For example, if the size of a chunk in a data file is 4 MB and is divided into 8 KB blocks then, the chunk will be divided into 512 8 KB blocks. Given the possibility chunking or re-chunking a given chunk at every backup update, the metadata that indicates the offset of data allows understanding where all 512 8 KB blocks are located in the chunk and overall, the data file. An example a data structure of chunk with metadata block is further described, for example, in FIG. 6.

In accordance with an embodiment, the method 100 further comprises the step of writing the data file to the key value storage includes, for each variable size chunk in the file having a size y: compressing the variable size chunk to a size smaller than y, writing the compressed variable chunk to the storage and padding the variable chunk up to the size y rounded to the block size. In a scenario, the data file of each variable size chunk may have a size represented by y is such compressed that the size of the variable size chunk is compressed to lesser than y. For example, a variable size chunk of size 15 KB (i.e. y) is compressed to a variable size chunk of size 7 KB. Therefore, in order to be able to write to the compressed variable size chunk of size smaller than y, the compressed variable chunk data may be padded with compressible data so that the size of variable chunk data after compression is the same as before compression (i.e. y). For example, a variable size chunk of size 15 KB after compression is padded with ones as ones compress very well (or other known compressible characters) so that size of the variable size chunk becomes 15 KB (i.e. same as size of the variable size chunk before compression). Moreover, one of the advantages of the variable size chunking format is that an external (or different) compression algorithm may be used and leveraged than only using an existing internal storage compression algorithm in the key value-based storage (e.g. a block storage used as the key value-based storage). As the variable length deduplication is effectively deployed in the method 100, each chunk (which may be typically larger than 8 KB, for example, 16 KB or about 32 KB), can be compressed with higher deduplication ratios.

In accordance with an embodiment, a block storage is used as the key value storage, using the block address as the key, comprising the step of padding the block storage with compressible data up to the block size. The block storage refers to a hardware storage that supports reading and writing data in fixed-size blocks, sectors, or clusters. The block storage uses the block address as the key to randomly access the blocks of the data file stored in the block storage. Further, the block storage pads the compressed variable chunk data with compressible data (e.g. ones or any other fixed compressible character) so that the size of variable chunk data after compression is same as before compression to enable writing to the compressed variable size chunk.

Figure 2:
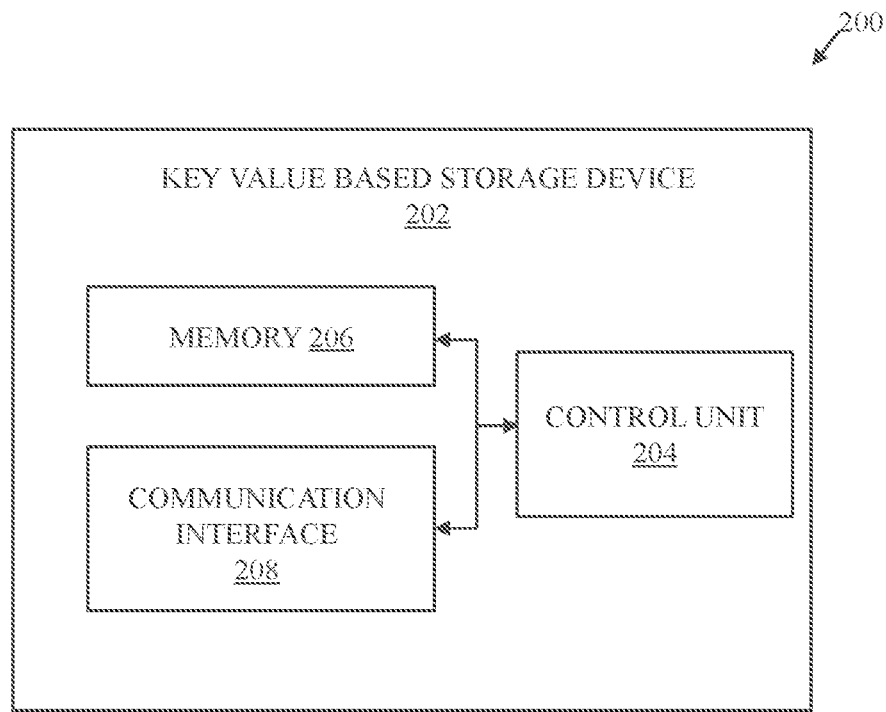
FIG. 2 is a block diagram that illustrates various exemplary components of a key value-based storage device, in accordance with an embodiment of the present disclosure.

FIG. 2 is a block diagram that illustrates various exemplary components of a key value-based storage device, in accordance with another embodiment of the present disclosure. FIG. 2 is described in conjunction with FIG. 1. With reference to FIG. 2, there is shown a key value-based storage system 200, which may comprise one or more the key value-based storage devices, such the key value-based storage device 202. The key value-based storage device 202 comprises a control unit 204. The key value-based storage device 202 further comprises a memory 206 and a communication interface 208.

The key value-based storage device 202 refers to a storage that stores the data file using key-value entries. The key value-based storage device 202 supports accessing (reading and writing) data file by creating mapping between a key and corresponding value (i.e. data) in the data file and hence, provides a way to quickly and reliably store, retrieve, and update the data file. In an implementation, a block storage at the backend may be used and implemented as the key value-based storage device 202. The key value-based storage device 202 includes suitable logic, circuitry, interfaces, and/or code that is configured to store and process the data. Other examples of the key value-based storage device 202 include, but is not limited to a server, a secondary storage, a block-storage based computing device in a computer cluster (e.g. massively parallel computer clusters), a block-storage based electronic device, or a supercomputer.

The control unit 204 refers to a controller that is configured to control the writing of the data to the key value-based storage device 202. In an implementation, the control unit 204 is configured to execute control instructions stored in the memory 206 for controlling writing of the data to the key value-based storage device 202. Examples of the control unit 204 includes, but are not limited to a control circuitry, microprocessor, a microcontroller, a complex instruction set computing (CISC) microprocessor, a reduced instruction set (RISC) microprocessor, a very long instruction word (VLIW) microprocessor, a central processing unit (CPU), a state machine, a data processing unit, and other processors or control circuitry.

The memory 206 refers to key value-based storage and may include suitable logic, circuitry, and interfaces that may be configured to store data and the instructions executable by the control unit 204. The memory 206 may also include other known components, such as disk head, and the like, used to read and write data (not shown for the sake of brevity). Examples of implementation of the memory 206 may include, but are not limited to, a hard disk drive (HDD), solid-state drive (SSD), a back-up storage disk, a block storage unit, or other computer storage media. The memory 206 may store an operating system and/or other program products (including one or more operation algorithms) to operate the key value-based storage device 202.

The communication interface 208 refers to a network interface or a transceiver that is configured to facilitate data communication to and from the key value-based storage device 202. The communication interface 208 may support communication protocols for Internet Small Computer Systems Interface (iSCSI), fibre channel, or Fibre Channel over Ethernet (FCoE) protocols. The communication interface 208 may also support communication protocols for one or more of peer-to-peer network, a hybrid peer-to-peer network, local area networks (LANs), metropolitan area networks (MANS), wide area networks (WANs), all or a portion of a public network such as the global computer network known as the Internet, a private network, or any other communication system or systems at one or more locations. Additionally, the communication interface 208 supports wired or wireless communication that can be carried out via any number of known protocols, including, but not limited to, Internet Protocol (IP), Wireless Access Protocol (WAP), Frame Relay, or Asynchronous Transfer Mode (ATM). Moreover, any other suitable protocols using voice, video, data, or combinations thereof, can also be employed and supported by the communication interface 208.

In one aspect, the present disclosure provides the key value-based storage device 202 comprises the control unit 204 for controlling the writing of data to the key value-based storage device 202. The control unit 204 controls writing of the data to the key value-based storage device 202 by executing control instructions stored in the memory 206 for controlling writing of the data to allow random write operation in the data file.

In operation, the control unit 204 for the key value-based storage device 202 for storing a data file, said control unit 204 being arranged to perform steps for a data file being stored in the storage device 202. The control unit 204 divides the data file into at least two variable size chunks. The data file is divided into at least two variable size chunks such as a first chunk and a second chunk by the control unit 204 of the key value-based storage system 200. Further, the size of the first chunk and the second chunk is different from each other. The average chunk size of the first chunk and the second chunk is larger than a given size of fixed size blocks. For example, the size of fixed size block may be 8 KB, whereas the chunk size of the first chunk and the second chunk much larger than 8 KB.

The control unit 204 further divide each of the variable size chunks into blocks, wherein the blocks may have different sizes depending on the amount of data in each block. Each variable size chunks, such as the first chunk and the second chunk are divided into blocks by the control unit 204 of the key value-based storage device 202. An example of dividing each of the variable size chunks into blocks is shown and described, for example, in FIG. 3.

In accordance with an embodiment, the control unit 204 is arranged to divide one of the variable size chunks having a size m, by dividing each chunk into n blocks having a fixed size k and one residue block having the size p, n being the result of an integer division of m/k and p being the remainder of the integer division. For example, if the size of the first chunk is 20 KB (say, m=20 KB) and is divided into fixed size blocks of size 8 KB (say k=8), the first chunk is divided into 2 (i.e. n=2) fixed size blocks by the integer division of 20/8 and one residual block of size 4 KB (i.e. p=4) determined by remainder of the integer division.

In accordance with an embodiment, the control unit 204 is arranged to place the residue block as the last block in the variable size chunk. For example, if the first chunk of 20 KB is divided into a first block of 8 KB, a second block of 8 KB and a third block of 4 KB, the third block is the residue block. The control unit 202 is configured to store blocks (i.e. small chunks) in the memory 206, which are less than or equal to 8 KB, and thus there is no need to leverage compressible data padding (or any other fixed character compressible padding) padding. In other words, the chunks are divided to block of size 8 KB except the last block which is less than 8 KB, which can be stored as an object with less than 8 KB, saving the need to transfer (or transmit) zeros (or any other fixed character padding) in I/O operations, such as random writes, thereby saving bandwidth.

The control unit 204 further generate a set of metadata for the data file including information indicating the size of each block and the size of each chunk. The metadata includes information regarding the size of each block and the size of each chunk to allow random access of each block of the data file for random write/read operation. Based on the set of metadata for the data file, the data file is saved by using key-value entries. Hence, random access of each block and chunk are allowed by accessing the correct key-value entries. The metadata may further include information such as the data file name, the data file ID and other data file properties.

The control unit 204 further enables writing the data file and the set of metadata to the key value-based storage 202. The set of metadata represents a set of key value store entries, and random access is allowed by accessing the correct key. Thus, the set of metadata enables to understand where the actual data (e.g. all the 8 KB block data) is located, which allows accurate random access even in variable sized chunks.

In accordance with an embodiment, the control unit 204 is further arranged to perform deduplication on the at least two blocks based on the metadata information regarding the size of each block. The deduplication is performed by the control unit 204 of the key value-based storage device 202 to reduce duplicate data in the data file.

In accordance with an embodiment, the control unit 204 is further arranged to receive a new sequence of data to be written to the data file, determine the offset and size of the new sequence of data and write it to the data file based on the offset without changing the division into chunks and blocks. An example of how to effectively configure a data file to be able to write the new sequence of data in the data file, is shown and described, for example, in FIGS. 5A-5C.

In accordance with an embodiment, the control unit 204 is further arranged to divide (or configured to divide) the data file into at least two fixed size chunks having a fixed size x, independently of the division into variable size chunks and within each fixed size chunk, and when writing the data file to the key value storage, including padding for each fixed size chunk, said padding being positioned within the fixed size chunk and/or after the fixed size chunk. The various embodiments, operations, and variants disclosed in the method 100 of FIG. 1 apply mutatis mutandis to the key value-based storage device 202.

A computer program product comprising computer-readable code which when run in the control unit 204 controlling the key value-based storage device 202 will control (i.e. is configured to control) the writing of the data file to the key value-based storage device 202 by performing the method 100. The computer program product may include, but is not limited to, an electronic storage device, a magnetic storage device, an optical storage device, an electromagnetic storage device, a semiconductor storage device, or any suitable combination of the foregoing. In yet another aspect, the present disclosure provides a computer program adapted to perform the method 100 by a device (e.g. the key value-based storage device 202).

In accordance with an embodiment, the computer program product comprising a non-transitory storage on which the code is stored. The non-transitory computer-readable storage medium has computer-readable instructions being executable by a processor to execute the method 100. Examples of implementation of the non-transitory computer-readable storage medium include, but is not limited to, an electrically erasable programmable read-only memory (EEPROM), a read-only memory (ROM), an HDD, a flash memory, a Secure Digital (SD) card, an SSD, or a computer readable storage medium.

Figure 3:
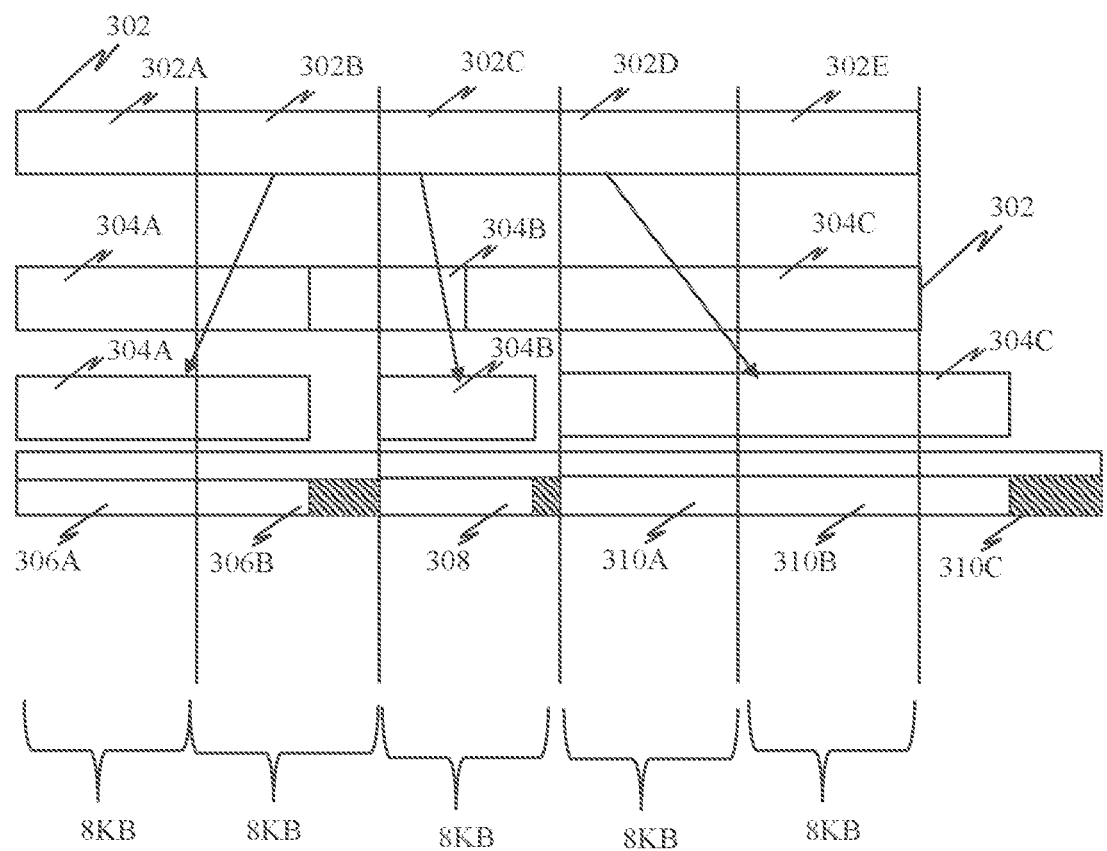
FIG. 3 is an exemplary illustration of chunking of a data file, in accordance with an embodiment of the present disclosure.

FIG. 3 is an exemplary illustration of chunking a data file for achieving variable size deduplication, in accordance with an embodiment of the present disclosure. FIG. 3 is described in conjunction with elements from FIGS. 1 and 2. With reference to FIG. 3, there is shown a data file 302. In the present disclosure, the data file 302 is divided into variable size chunks using variable size chunking algorithms, such that the data file 302 is divided into a first variable size chunk 304A, a second variable size chunk 304B and a third variable size chunk 304C. For example, if the size of the data file 302 is 40 KB, the size of the first variable size chunk 304A is 13 KB, the size of the second variable size chunk 304B is 7 KB and the size of the third variable size chunk 304C is 20 KB. Further, each of the first variable size chunk 304A, the second variable size chunk 304B and the third variable size chunk 304C is divided into blocks of fixed size 'k' and one residual block. The size of the residual block is lesser than fixed size 'k'. For example, if the fixed size 'k' is 8 KB then, the first variable size chunk 304A is divided into a first block 306A of size 8 KB and a second block 306B of size 5 KB. Further, the second variable size chunk 304B is divided into one block, such as a first block 308 of size 7 KB. Furthermore, the third variable size chunk 304C is divided into a first block 310A of size 8 KB, a second block 310B of size 8 KB and a third block 310C of size 4 KB. The data file 302 may be stored as a set of key-value pairs. For example, the first block 306A of the first variable size chunk 304A is stored as (1,0→o1), the second block 306B of the first variable size chunk 304A is stored as (1,8→o2), the first block 308 of the second variable size chunk 304B is stored as (1,16→o3), the first block 310A is stored as (1,24→o4), the second block 310B is stored as (1,32→o5) and the third block 310C of the third variable size chunk 304C is stored as (1,40→o6).

In contradiction to such other systems, the control unit 204 allows dividing each of the variable size chunks 304A, 304B, and 304C into blocks 306A, 306B, 308, 310A, and 310B, wherein the blocks 306A and 310A have same size except the residue blocks, such as blocks 306B, 308, and 310B (last block of each chunk), and there is no strict requirement to pad the last block of each chunk, if less than 8 KB with trailing compressible data to make it of standard block size, which improves bandwidth and saves the need to transfer (or transmit) ones (or any other fixed character padding) in I/O operations, such as random writes, and in storage/backup activities. However, it is to be understood that it is possible to perform padding the residue block with compressible data without limiting the scope of the disclosure, although such padding may decrease bandwidth.

The data file 302 is typically divided using a fixed size chunking, such that the data file 302 is divided into a first chunk 302A, a second chunk 302B, a third chunk 302C, a fourth chunk 302D and a fifth chunk 302E of fixed size. For example, if the size of the data file is 40 KB then there are only five blocks of size of 8 KB.

Figure 4:
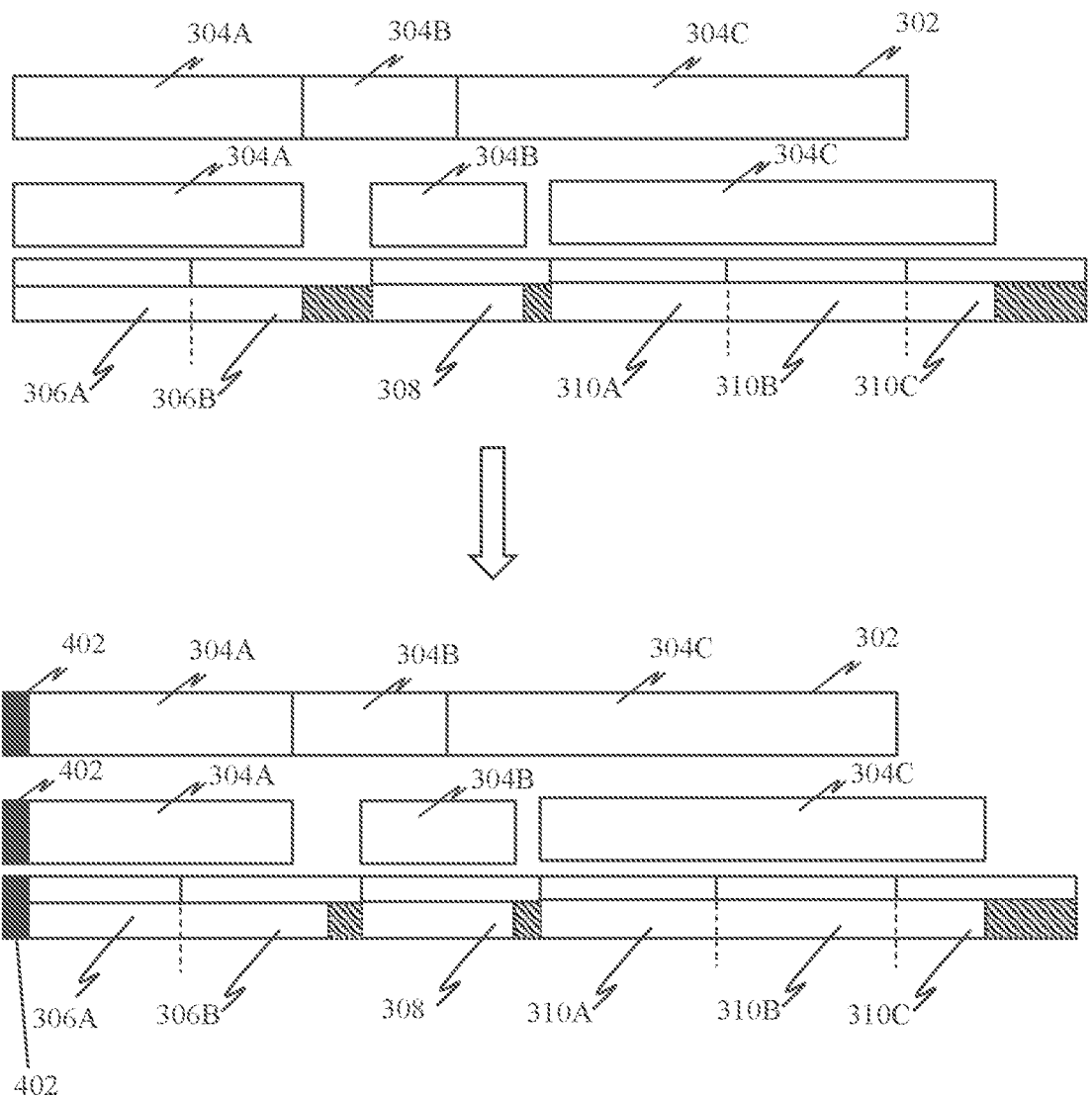
FIG. 4 is an exemplary illustration of operation of a data insertion at the start of a data file that is divided into variable sized chunks, in accordance with another embodiment of the present disclosure.

FIG. 4 is an exemplary illustration of operation of a data insertion at the start of a data file that is divided into variable sized chunks, in accordance with an embodiment of the present disclosure. FIG. 4 is described in conjunction with elements from FIGS. 1, 2, and 3. With reference to FIG. 4, there is shown the data file 302. The data file 302 is divided into the first variable size chunk 304A of size 13 KB, the second variable size chunk 304B of size 7 KB and the third variable size chunk 304C of size 20 KB. The variable size chunks 304A, 304B, and 304C are stored in the key value-based storage device 202 (e.g. a block storage used as the key value-based storage) aligned (i.e. byte aligned) to 8 KB storage space (represented by patterned blocks of equal size). The control unit 204 allows dividing each of the variable size chunks 304A, 304B, and 304C into blocks 306A, 306B, 308, 310A, 310B, and 310C, wherein the blocks 306A, 310A, 310B have same size of 8 KB except the residue blocks, such as blocks 306B, 308, and 310C (last block of each chunk) that are less than 8 KB.

In this case, when new data 402 (e.g. 1 KB data) is inserted at the beginning of the data file 302, the size of the data file 302 changes to 41 KB, and only the size of the first variable size chunk 304A increases by size of the new data insert (i.e. of 1 KB). For example, the size of the first variable size chunk 304A increases to 14 KB from 13 KB. This leads to change in the first block 306A and the second block 306B of the first variable size chunk 304A. However, the size of the second variable size chunk 304B and the third variable size chunk 304C remains the same. For example, the size of the second variable size chunk 304B and the third variable size chunk 304C remains 7 KB and 20 KB respectively. Hence, the block 308 of the second variable size chunk 304B; and the first block 310A, the second block 310B and the third block 310C of the third variable size chunk 304C remains the same and thus, deduplication of the second variable size chunk 304B and the third variable size chunk 304C can be done and a higher deduplication ratio can be achieved.

Moreover, for effective deduplication, the variable size chucking may occur only when the data file 302 is created for the first time by a backup system, which ensures the performance of random writes to be similar to random writes performance as with the fixed size deduplication. However, on subsequent write of larger data, for example, 8 KB or more than 8 KB, to the data file 302, the additional subsequent writes may be overwritten to existing blocks of data, and thus avoided. For example, in the FIG. 4, after the data file 302 is written in the key value-based storage device 202 once and variably chunked once, and a subsequent random write to offset 16 KB and size 8 KB arrives, then the new data may be overwritten to the last 3 KB of the block 308 and the first 5 KB of the first block 310A (which is the beginning of the third variable size chunk 304C), which is not desirable.

In a backup scenario, it is desired that the data file 302 chunking is updated upon every backup. However, the problem of re-chunking the data is that due to new holes (i.e. locations padded with compressible data, or new blocks inserted which have object size of less than 8 KB), a file may not be large enough to store all the data, and the data of whole file may need to shifted from original block locations (e.g. a right byte shifting in block storage), meaning we need to re-copy (i.e. rewrite) the whole file. In other words, for subsequent write operations, another effective and improved mechanism may be employed by using smart file format, described below in FIGS. 5A to 5C.

Figure 5A:
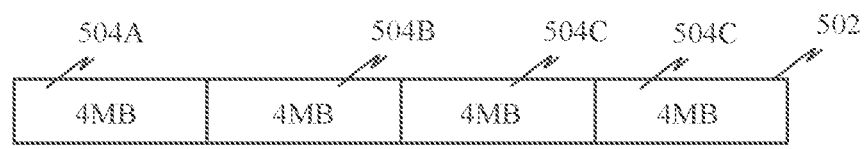
FIGS. 5A, 5B, and 5C are exemplary illustrations of configuring a data file to allow writing a new sequence of data in the data file without data spilling between different chunks, in accordance with an embodiment of the present disclosure.
Figure 5B:
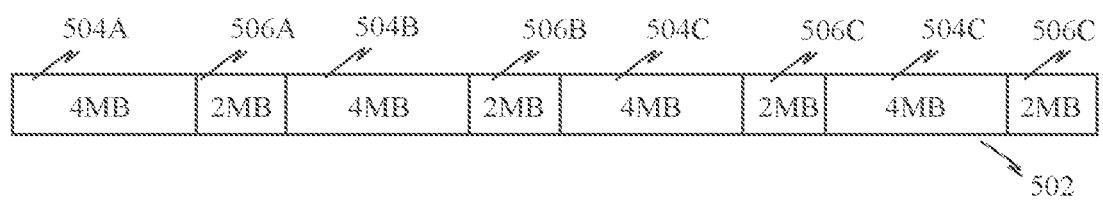
Figure 5C:
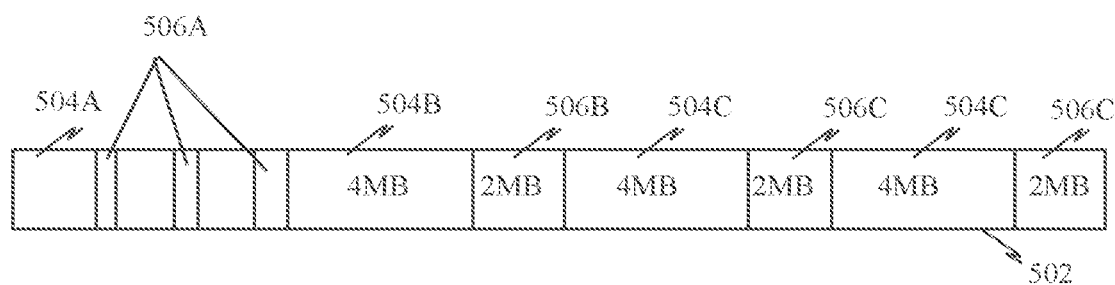

FIGS. 5A to 5C are exemplary illustrations of configuring a data file to allow writing a new sequence of data in the data file without data spilling between different chunks, in accordance with an embodiment of the present disclosure. With reference to FIG. 5A, there is shown the data file 502. The data file 502 is divided into a first chunk 504A, a second chunk 504B, a third chunk 504C and a fourth chunk 504D. For example, the size of the data file 502 is 16 MB (data stored in one large data file) and the size of each of the first chunk 504A, the second chunk 504B, the third chunk 504C and the fourth chunk 504D is 4 MB.

With reference to FIG. 5B, there is shown the data file 502 with the padding within the fixed size chunks. In other words, a first padding 506A is added within the first chunk 504A (i.e. at the end of the first chunk 504A, which implies padding between the first chunk 504A and the second chunk 504B). similarly, a second padding 506B is added within the second chunk 504B (which implies padding between the second chunk 504B and the third chunk 504C). Likewise, third padding 506C and the fourth padding 506D are added to their corresponding chunks, as shown. Further, size of each of the first padding 506A, the second padding 506B, the third padding 506C and the fourth padding 506D is kept about 50% of the size of each of the first chunk 504A, the second chunk 504B, the third chunk 504C and the fourth chunk 504D. For example, the size of the first chunk 504A, the second chunk 504B, the third chunk 504C and the fourth chunk 504D is 4 MB each then, the size of each of the first padding 506A, the second padding 506B, the third padding 506C and the fourth padding 506D is 2 MB. The first padding 506A, the second padding 506B, the third padding 506C and the fourth padding are added to allow variable size chunking in subsequent writes without the need to rewrite the data file 502.

With reference to FIG. 5C, there is shown the data file 502 in which the first chunk 504A includes the padding 506A. Since, size of the first chunk 504A is big enough, the first chunk 504A did not spill to the second chunk 504B after variable size chunking. Hence, the first chunk 504A can be re-chunked granularly without affecting any other part of the data file 502, that is without affecting the second chunk 504B, the third chunk 504C and the fourth chunk 504D and thus avoids rewrite of the whole data file 502. In another example, if a virtual machine is backed-up, on consecutive backups, re-chunking of only one big chunk (e.g. the 4 MB big chunk) which had change, can be executed, and this allows us to keep the variable size chunking. The metadata for the offsets of the chunk ends can be kept in the first 8 KB (i.e. beginning block) of each such big chunks, such as the 4 MB chunks in this example. In other words, in order to allow accessing the data file 502 in random access, metadata block is added at the beginning of each large chunk, where the metadata indicates a mapping from offset (of data blocks) in the logical chunk (e.g. the 4 MB chunk) stored in the next big chunk.

Figure 6:
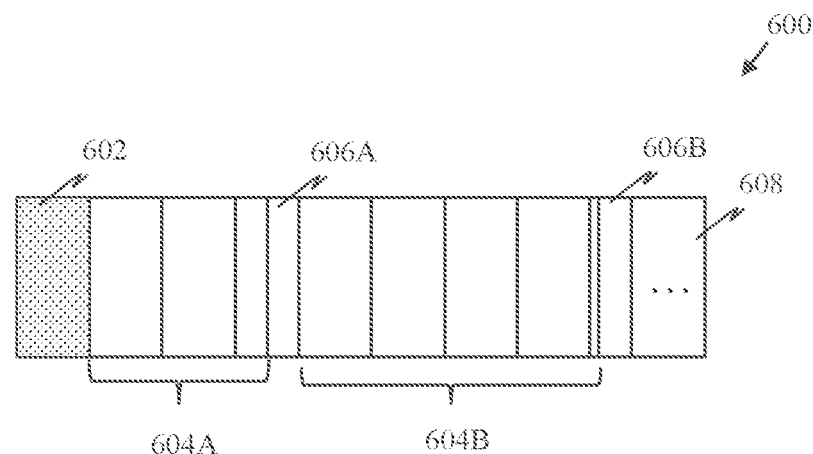
FIG. 6 is an illustration of an exemplary data structure of a chunk with a metadata block at a beginning of the chunk, in accordance with an embodiment of the present disclosure.

FIG. 6 is an illustration of an exemplary data structure of a chunk with a metadata block at a beginning of the chunk, in accordance with an embodiment of the present disclosure. With reference to FIG. 6, there is shown a data structure 600 of a chunk (e.g. a 4 MB big chunk) of a large data file. The data structure 600 of the chunk include a metadata block 602, blocks 604A and 604B containing data and patterned portions 606A and 606B indicate holes (e.g. remaining non-data portion of residue blocks without padding, or padding in some use cases). Further, a portion 608 at the end of the chunk indicates that the data structure 600 of the chunk is a 4 MB data containing chunk in a 6 MB sparse address space (with 2 MB padding).

In this example, a part of the original data file (e.g. data file 502) starts at offset which is multiple of 4 MB. For metadata, it is searched only at the beginning of the chunk (e.g. 4 MB chunk), and the data in the chunk which was originally 7 blocks and 54 KB, may be chunked to first chunk of 20 KB and second chunk of 34 KB (3rd chunk not shown here, but its size may be say 26 KB). Now, in this example, the metadata header in the metadata block 602 for 7 data blocks may be the following, in an example.

1. Block 0—points to block 0, start offset 0, next chunking point is at sparse block 2 at offset 4 KB;
2. Block 1—points to block 1, start offset 0, next chunking point is at sparse block 2 at offset 4 KB;
3. Block 2—points to block 2, start offset 0, next chunking point is at sparse block 2 at offset 4 KB;
4. Block 3—points to block 3, start offset 4 KB, next chunking point is at sparse block 7 at offset 2 KB;

5. Block 4—points to block 4, start offset 4 KB, next chunking point is at sparse block 7 at offset 2 KB;
6. Block 5—points to block 5, start offset 4 KB, next chunking point is at sparse block 7 at offset 2 KB;
7. Block 6—points to block 6, start offset 4 KB, next chunking point at sparse block 7 at offset 2 KB.

As the 4 MB of data contain 512 8 KB blocks, each pointer will point the location where the block starts, i.e. a block number in the 6 MB sparse block (2 bytes), what offset inside the block it starts (2 bytes), and the location of the next chunk in the chunking algorithm, this data allows understanding where all the 8 KB of data is located (which can be in 1-3 blocks/objects in the sparse representation) for accurate random access of data in the data file/chunks of data file. Thus, the metadata header (i.e. the metadata block 602 of 8 KB) may be divided into about 512, 16 bytes pointers (512*16=8192 bytes, i.e. ~8 KB).

Figure 7:
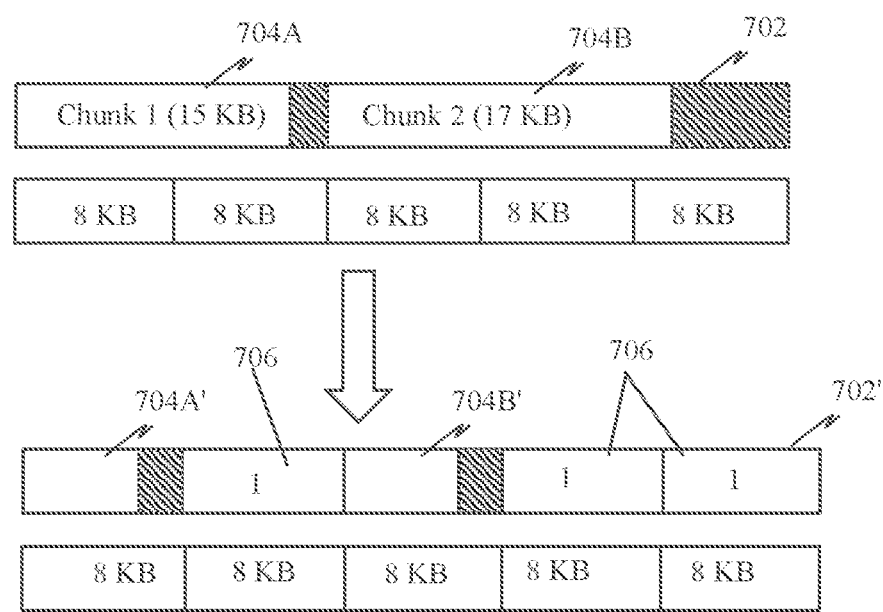
FIG. 7 is an illustration that depicts exemplary operations of writing compressed variable chunks to a storage and padding the variable chunks, in accordance with an embodiment of the present disclosure.

FIG. 7 is an illustration that depicts exemplary operations of writing compressed variable chunks to a storage and padding the variable chunks, in accordance with an embodiment of the present disclosure. With reference to FIG. 7, there is shown a data file 702A, for example, of 32 KB, which is chunked to two variable sized chunks, such as first variable size chunk 704A of 15 KB and a second variable size chunk 704B of 17 KB. The chunks may be further divided into blocks of different sizes depending on the amount of data in each block before compression, and are byte aligned to fixed size blocks each of 8 KB, where patterned portions in residue block indicate holes (e.g. 1 KB less than 8 KB). The chunks, such as the first variable size chunk 704A of 15 KB and the second variable size chunk 704B of 17 KB, may be compressed separately and these may compress to 7 KB, such as a compressed first variable size chunk 704A' and a compressed second variable size chunk 704B' as shown in the compressed data file 702'. There is further shown compressible data 706 that is padded to each chunk in the compressed data file 702'.

In contradiction to other systems, each of the chunks after compression is padded with compressible data 706 so that size of the variable size chunks is same after compression as of the variable size chunks before compression. This avoids the problem of rewriting the whole file when there is new data, which is then not further compressible. In other words, beneficially, in order to be able to write compressible data in place accurately, the compressed data of each chunk is padded with the compressible data 706 (e.g. ones or fixed compressible character) so that the size of data file 702' after compression is the same as the size of data file 702 before compression. Hence, in this case, the first variable size chunk 704A and the second variable size chunk 704B is padded with ones (also represented by "1"). Moreover, there may be blocks which are completely empty but when new data is written to the data file 702' in random access, the key value-based storage device 202 writes the data in proper place, for example, at padded portions. Hence, writing of mew data in the data file 702' is done without any need of rewriting the whole data file 702.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural. The word "exemplary" is used herein to mean "serving as an example, instance or illustration". Any embodiment described as "exemplary" is not necessarily to be construed as preferred or advantageous over other embodiments and/or to exclude the incorporation of features from other embodiments. The word "optionally" is used herein to mean "is provided in some embodiments and not provided in other embodiments". It is appreciated that certain features of the present disclosure, which are, for clarity, described in the context of separate embodiments, may also be provided in combination in a single embodiment. Conversely, various features of the disclosure, which are, for brevity, described in the context of a single embodiment, may also be provided separately or in any suitable combination or as suitable in any other described embodiment of the disclosure.

The invention claimed is:

1. A method, comprising:
    dividing a data file into at least two variable size chunks, wherein each of the at least two variable size chunks comprises a first size;
    dividing each of the variable size chunks into blocks, wherein each of the blocks comprises an amount of first data, and wherein a second size of each of the blocks depends on the amount of first data in the block;
    generating a set of first metadata for the data file, wherein the set of first metadata comprises first information indicating the first size of each of the at least two variable size chunks and second information indicating the second size of each of the blocks; and
    writing the data file and the set of first metadata to a key value-based storage.

2. The method of claim 1, wherein the first size is m, wherein the blocks comprise n fix sized blocks, wherein the second size is k, wherein each of the blocks comprises a residue block having a third size p, wherein n is a result of an integer division of m by k, and wherein p is a remainder of the integer division.

3. The method of claim 2, further comprising placing the residue block as a last block in the one of the at least two variable size chunks.

4. The method of claim 1, further comprising performing, based on the second information, deduplication on the blocks.

5. The method of claim 1, further comprising:
    receiving a new sequence of data to be written to the data file;
    determining an offset and a third size of the new sequence; and
    writing, based on the offset, the new sequence to the data file without changing the variable size chunks and the blocks.

6. The method of claim 1, wherein the second size is 8 kilobytes (KB) or a multiple of 8 KB.

7. The method of claim 1, wherein the set of first metadata further comprises a first offset value indicating a start of a first one of the blocks.

8. The method of claim 1, further comprising dividing the data file into at least two fixed size chunks having a fixed size x, wherein writing the data file and the set of first metadata to the key value-based storage comprises including padding for each of the at least two fixed size chunks, and wherein the padding is positioned within each of the at least two fixed size chunks or after the at least two fixed size chunks.

9. The method of claim 8, wherein the padding for each of the at least two fixed size chunks is added to a total chunk size of $(1+n/y)*x$, where n is a third size of each of the at least two fixed size chunks, and wherein y is an average size of the at least two variable size chunks.

10. The method of claim 9, wherein each of the at least two fixed size chunks comprises second metadata indicating an offset of second data in the fixed size chunk to allow random access to the second data.

11. The method of claim 1, wherein writing the data file and the set of metadata to the key value-based storage comprises:
compressing each of the at least two variable size chunks to produce a compressed variable chunk for each of the at least two variable size chunks, wherein a third size of each of the compressed variable chunks is less than y; and
padding the compressed variable chunks up to y.

12. The method of claim 1, wherein the key value storage comprises block storage, and wherein the method further comprises:
using a block address of the block storage as a key; and
padding the block storage with compressible data up to a block size of the block storage.

13. An apparatus, comprising:
a memory configured to store instructions; and
one or more processors coupled to the memory and configured to execute the instructions to:
divide a data file into at least two variable size chunks, wherein each of the at least two variable size chunks comprises a first size;
divide each of the variable size chunks into blocks, wherein each of the blocks comprises an amount of first data, and wherein a second size of each of the blocks depends on the amount of first data in the block;
generate a set of first metadata for the data file, wherein the set of first metadata comprises first information indicating the first size of each of the at least two variable size chunks and second information indicating the second size of each of the blocks; and
write the data file and the set of first metadata to key the key value-based storage.

14. The apparatus of claim 13, wherein one of the at least two variable size chunks has a size m, wherein the one or more processors are further configured to execute the instructions to divide the one of the at least two variable size chunks into n fixed size blocks having a fixed size k and a residue block having a third size p, wherein n is a result of an integer division of m by k, and wherein p is a remainder of the integer division.

15. The apparatus of claim 14, wherein the one or more processors are further configured to execute the instructions to place the residue block as a last block in the one of the at least two variable size chunks.

16. The apparatus of claim 13, wherein the one or more processors are further configured to execute the instructions to perform, based on the second information, deduplication on the blocks.

17. The apparatus of claim 13, wherein the one or more processors are further configured to:
receive a new sequence of data to be written to the data file;
determine an offset and a third size of the new sequence; and
write, based on the offset, the new sequence to the data file without changing the variable size chunks and the blocks.

18. A computer program product comprising instructions stored on a non-transitory computer-readable medium that, when executed by one or more processors, cause an apparatus to:
divide a data file into at least two variable size chunks, wherein each of the at least two variable size chunks comprises a first size;
divide each of the variable size chunks into blocks, wherein each of the blocks comprises an amount of first data, and wherein a second size of each of the blocks depends on the amount of first data in the block;
generate a set of first metadata for the data file, wherein the set of first metadata comprises first information indicating the first size of each of the at least two variable size chunks and second information indicating the second size of each of the blocks; and
write the data file and the set of first metadata to key value-based storage.

19. The computer program product of claim 18, wherein one of the at least two variable size chunks has a size m, wherein for the one of the at least two variable size chunks, the one or more processors are configured to execute the instructions to divide each of the variable size chunks into the blocks by dividing the one of the at least two variable size chunks into n fixed size blocks having a fixed size k and a residue block having a third size p, wherein n is a result of an integer division of m by k, and wherein p is a remainder of the integer division.

20. The computer program product of claim 19, wherein the one or more processors are further configured to execute the instructions to place the residue block as a last block in the one of the at least two variable size chunks.

* * * * *

UNITED STATES PATENT AND TRADEMARK OFFICE
CERTIFICATE OF CORRECTION

| | | |
|---|---|---|
| PATENT NO. | : 12,130,779 B2 | |
| APPLICATION NO. | : 18/315839 | |
| DATED | : October 29, 2024 | |
| INVENTOR(S) | : Assaf Natanzon | |

It is certified that error appears in the above-identified patent and that said Letters Patent is hereby corrected as shown below:

In the Claims

Claim 13, Column 21, Lines 39-40: "to key the key value-based" should read "to key value-based"

Signed and Sealed this
Tenth Day of December, 2024

*Katherine Kelly Vidal*

Katherine Kelly Vidal
*Director of the United States Patent and Trademark Office*